United States Patent
Kim et al.

(10) Patent No.: US 8,599,819 B2
(45) Date of Patent: Dec. 3, 2013

(54) METHOD OF TRANSMITTING SOUNDING REFERENCE SIGNAL

(75) Inventors: Hak Seong Kim, Anyang-si (KR); Bong Hoe Kim, Hanam-si (KR); Young Woo Yun, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 634 days.

(21) Appl. No.: 12/532,733

(22) PCT Filed: Jun. 18, 2008

(86) PCT No.: PCT/KR2008/003436
§ 371 (c)(1),
(2), (4) Date: Sep. 23, 2009

(87) PCT Pub. No.: WO2008/156293
PCT Pub. Date: Dec. 24, 2008

(65) Prior Publication Data
US 2010/0103902 A1    Apr. 29, 2010

Related U.S. Application Data

(60) Provisional application No. 60/944,802, filed on Jun. 19, 2007.

(30) Foreign Application Priority Data

Jun. 18, 2008   (KR) .................. 10-2008-0057118

(51) Int. Cl.
*H04B 7/208*     (2006.01)
*H04W 4/00*      (2009.01)

(52) U.S. Cl.
USPC ........................................ 370/344; 370/329

(58) Field of Classification Search
USPC ........................................................ 370/344
See application file for complete search history.

(56) References Cited

U.S. PATENT DOCUMENTS

| | | | |
|---|---|---|---|
| 6,031,831 | A  | 2/2000  | Tan Boon et al. |
| 6,359,923 | B1 | 3/2002  | Agee et al. |
| 6,480,522 | B1 | 11/2002 | Hoole et al. |
| 6,621,851 | B1 | 9/2003  | Agee et al. |
| 6,628,956 | B2 | 9/2003  | Bark et al. |

(Continued)

FOREIGN PATENT DOCUMENTS

| | | |
|---|---|---|
| EP | 1175022 | 1/2002 |
| EP | 1349292 | 10/2003 |

(Continued)

OTHER PUBLICATIONS

Samsung, "UL Reference Signal Multiplexing", 3GPP TSG RAN WG1 Meeting #47, R1-063257, Nov. 2006.

(Continued)

*Primary Examiner* — Shaq Taha
(74) *Attorney, Agent, or Firm* — Lee, Hong, Degerman, Kang & Waimey (57) ABSTRACT

A method of transmitting a sounding reference signal (SRS) includes receiving SRS operation information including a sounding indicator, the sounding indicator indicating whether SRS transmission takes place at a subframe; generating the SRS according to the SRS operation information, and if the sounding indicator indicates occurrence of SRS transmission, transmitting the SRS at the subframe. Multiplexing can be achieved without collision between data and a sounding reference signal and single carrier characteristics required in uplink transmission can be preserved.

2 Claims, 5 Drawing Sheets

(56) References Cited

U.S. PATENT DOCUMENTS

| | | | |
|---|---|---|---|
| 6,804,307 B1 | 10/2004 | Popovic | |
| 6,873,606 B2 | 3/2005 | Agrawal et al. | |
| 7,106,781 B2 | 9/2006 | Agee et al. | |
| 7,149,238 B2 | 12/2006 | Agee et al. | |
| 7,430,244 B2 | 9/2008 | Chung et al. | |
| 7,433,347 B1 | 10/2008 | Trott et al. | |
| 7,469,015 B2 | 12/2008 | Le Nir et al. | |
| 7,577,085 B1 | 8/2009 | Narasimhan | |
| 7,623,441 B1 | 11/2009 | Sampath et al. | |
| 7,675,886 B2 | 3/2010 | Agrawal et al. | |
| 7,720,168 B2 | 5/2010 | Su et al. | |
| 7,724,639 B1 | 5/2010 | Porat et al. | |
| 7,724,838 B2 | 5/2010 | Mantravadi | |
| 7,773,685 B2 | 8/2010 | Tirkkonen et al. | |
| 7,852,806 B2 | 12/2010 | Ahn et al. | |
| 7,869,402 B2 | 1/2011 | Yoon et al. | |
| 7,881,222 B2 | 2/2011 | Lee et al. | |
| 7,889,633 B2 | 2/2011 | Noh et al. | |
| 7,894,330 B2 | 2/2011 | Lee et al. | |
| 7,920,638 B2 | 4/2011 | Le Nir et al. | |
| 7,929,563 B2 | 4/2011 | Wang et al. | |
| 7,991,063 B2 | 8/2011 | Khan et al. | |
| 8,014,769 B2 | 9/2011 | Lee et al. | |
| 8,019,332 B2 | 9/2011 | Lee et al. | |
| 8,027,297 B2 | 9/2011 | Kim et al. | |
| 8,031,583 B2* | 10/2011 | Classon et al. | 370/208 |
| 8,031,668 B2 | 10/2011 | Wang et al. | |
| 8,036,197 B2* | 10/2011 | Pajukoski et al. | 370/342 |
| 8,041,362 B2 | 10/2011 | Li et al. | |
| 8,050,227 B2 | 11/2011 | Lee et al. | |
| 8,116,271 B2 | 2/2012 | Pi | |
| 8,155,069 B2 | 4/2012 | Chun et al. | |
| 2003/0067907 A1 | 4/2003 | Rezaiifar et al. | |
| 2003/0185159 A1 | 10/2003 | Seo et al. | |
| 2004/0058687 A1 | 3/2004 | Kim et al. | |
| 2004/0133841 A1 | 7/2004 | Lundby et al. | |
| 2004/0257978 A1 | 12/2004 | Shao et al. | |
| 2005/0068918 A1 | 3/2005 | Mantravadi et al. | |
| 2005/0157680 A1 | 7/2005 | Zhang et al. | |
| 2005/0180328 A1 | 8/2005 | Kim et al. | |
| 2005/0250540 A1 | 11/2005 | Ishii et al. | |
| 2005/0265250 A1 | 12/2005 | Gollamudi et al. | |
| 2006/0018259 A1 | 1/2006 | Kadous | |
| 2006/0023745 A1 | 2/2006 | Koo et al. | |
| 2006/0034240 A1 | 2/2006 | Kwak et al. | |
| 2006/0034383 A1 | 2/2006 | Su et al. | |
| 2006/0035643 A1 | 2/2006 | Vook et al. | |
| 2006/0045010 A1 | 3/2006 | Baker et al. | |
| 2006/0128410 A1 | 6/2006 | Derryberry et al. | |
| 2006/0146867 A1 | 7/2006 | Lee et al. | |
| 2006/0171342 A1 | 8/2006 | Dateki | |
| 2006/0193373 A1 | 8/2006 | Agee et al. | |
| 2007/0011550 A1 | 1/2007 | Agrawal et al. | |
| 2007/0040703 A1* | 2/2007 | Akkarakaran et al. | 340/961 |
| 2007/0070944 A1 | 3/2007 | Rinne et al. | |
| 2007/0140178 A1 | 6/2007 | Jung et al. | |
| 2007/0165739 A1 | 7/2007 | Hottinen et al. | |
| 2007/0171849 A1 | 7/2007 | Zhang et al. | |
| 2007/0183380 A1 | 8/2007 | Rensburg et al. | |
| 2007/0183384 A1 | 8/2007 | Kwak et al. | |
| 2007/0211656 A1* | 9/2007 | Kwak et al. | 370/319 |
| 2007/0223618 A1 | 9/2007 | Jeong et al. | |
| 2007/0253465 A1* | 11/2007 | Muharemovic et al. | 375/130 |
| 2007/0286261 A1 | 12/2007 | Molev-Shteiman | |
| 2008/0013610 A1 | 1/2008 | Varadarajan et al. | |
| 2008/0019307 A1 | 1/2008 | Tenny et al. | |
| 2008/0032630 A1 | 2/2008 | Kim et al. | |
| 2008/0037464 A1 | 2/2008 | Lim et al. | |
| 2008/0080634 A1 | 4/2008 | Kotecha et al. | |
| 2008/0101211 A1 | 5/2008 | Rao | |
| 2008/0151831 A1 | 6/2008 | Khan et al. | |
| 2008/0159323 A1* | 7/2008 | Rinne et al. | 370/431 |
| 2008/0182582 A1* | 7/2008 | Bachl et al. | 455/446 |
| 2008/0232234 A1 | 9/2008 | McCoy et al. | |
| 2008/0232300 A1 | 9/2008 | McCoy et al. | |
| 2008/0232395 A1 | 9/2008 | Buckley et al. | |
| 2008/0233964 A1* | 9/2008 | McCoy et al. | 455/450 |
| 2008/0267310 A1 | 10/2008 | Khan et al. | |
| 2008/0287155 A1* | 11/2008 | Xu et al. | 455/522 |
| 2008/0304467 A1* | 12/2008 | Papasakellariou et al. | 370/344 |
| 2008/0304593 A1 | 12/2008 | Khan et al. | |
| 2008/0310540 A1* | 12/2008 | Tiirola et al. | 375/267 |
| 2009/0046672 A1 | 2/2009 | Malladi et al. | |
| 2009/0046774 A1 | 2/2009 | Abou Rjeily | |
| 2009/0046789 A1 | 2/2009 | Xu et al. | |
| 2009/0055703 A1 | 2/2009 | Kim et al. | |
| 2009/0073922 A1 | 3/2009 | Malladi et al. | |
| 2009/0097447 A1 | 4/2009 | Han et al. | |
| 2009/0109906 A1 | 4/2009 | Love et al. | |
| 2009/0168922 A1 | 7/2009 | Malladi et al. | |
| 2009/0175233 A1 | 7/2009 | Ojala et al. | |
| 2009/0196240 A1 | 8/2009 | Frederiksen et al. | |
| 2009/0201863 A1 | 8/2009 | Pi | |
| 2009/0201904 A1 | 8/2009 | Lee et al. | |
| 2009/0238131 A1 | 9/2009 | Montojo et al. | |
| 2009/0245187 A1 | 10/2009 | Nam et al. | |
| 2009/0259909 A1 | 10/2009 | Luo | |
| 2009/0274037 A1 | 11/2009 | Lee et al. | |
| 2009/0290597 A1 | 11/2009 | Baumgartner et al. | |
| 2009/0303866 A1 | 12/2009 | Li et al. | |
| 2010/0220708 A1 | 9/2010 | Mantravadi et al. | |
| 2011/0142097 A1 | 6/2011 | Walton et al. | |
| 2011/0292900 A1 | 12/2011 | Ahn et al. | |
| 2012/0033650 A1 | 2/2012 | Ahn et al. | |
| 2012/0087363 A1 | 4/2012 | Jongren et al. | |

FOREIGN PATENT DOCUMENTS

| | | |
|---|---|---|
| EP | 1389848 | 2/2004 |
| EP | 1720310 | 11/2006 |
| EP | 1746855 | 1/2007 |
| EP | 1784036 | 5/2007 |
| EP | 1819088 | 8/2007 |
| JP | 2007-028569 | 2/2007 |
| KR | 2002-009079 | 2/2002 |
| KR | 2006-0092055 | 8/2006 |
| WO | 0176110 | 10/2001 |
| WO | 2004-051872 | 6/2004 |
| WO | 2004049613 | 6/2004 |
| WO | 2005-074312 | 8/2005 |
| WO | 2005/099103 | 10/2005 |
| WO | 2005-114888 | 12/2005 |
| WO | 2006/020339 | 2/2006 |
| WO | 2006-107835 | 10/2006 |
| WO | 2006/129749 | 12/2006 |
| WO | 2006-130742 | 12/2006 |
| WO | 2006/138337 | 12/2006 |
| WO | 2007/015305 | 2/2007 |
| WO | 2007-066936 | 6/2007 |
| WO | 2007/092258 | 8/2007 |

OTHER PUBLICATIONS

Nokia, "Data-non-associated Control Signal Transmission with UL Data," 3GPP TSG RAN WG1 Meeting #48, R1-071000, Feb. 2007, XP-002573203.

LTE Rapporteur (NTT DoCoMo), "Text Proposal for TS 36.300 (Stage 2 TS)," 3GPP TSG RAN WG1 Meeting #48, R1-071251, Feb. 2007, XP-050105206.

3rd Generation Partnership Project (3GPP); "Technical Specification Group Radio Access Network; LTE Physical Layer—General Description (Release 8)," 3GPP TS 36.201 v0.11, R1-071252, Mar. 2007, XP-050105207.

Nokia, "Data-non-associated control signal transmission with UL data", R1-071000, 3GPP TSG RAN WG1 Meeting #48, Feb. 2007.

Samsung, "UL Reference Signal Multiplexing", R1-063257, 3GPP TSG RAN WG1 Meeting #47, pp. 1-4, Nov. 2006.

Lee, H., et al., "Novel Multi-User MIMO Scheme Based on Successive Interference Cancellation", IEEE Int'l Symposium on Consumer Electronics, XP-031160370, Jun. 20, 2007.

LG Electronics Inc., "Allocation of UL ACK/NACK Index", 3GPP TSG RAN WG1#49, R1-072348, XP-050106077, May 7, 2007.

(56) References Cited

OTHER PUBLICATIONS

LG Electronics Inc., "PHICH Duration and Signaling", 3GPP TSG RAN WG1 #50, R1-073476, XP-050107084, Aug. 20, 2007.
Motorola, "PHICH Resource Signaling for TDD & FDD", 3GPP TSG RAN WG1 #51bis, R1-080433, XP-050108952, Jan. 14, 2007.
Motorola, "PHICH Resource Signaling for TDD & FDD", 3GPP TSG RAN WG1 #52bis, R1-081286, XP-050109724, Apr. 1, 2008.
Ericsson, "E-mail Summary Taking you Forward on Downlink Control Signaling", 3GPP TSG RAN WG1 #50bis, R1-074369, XP-050107884, Oct. 8, 2007.
Catt, et al., "Indication of PHICH Resource for TDD", 3GPP TSG RAN WG1 Meeting #52bis, R1-081326, XP-050109752, Mar. 31, 2008.
"LS on physical channel definition," R1-073231, 3GPP TSG RAN WG1 Meeting #49bis, Jun. 2007.
Panasonic, "CQI Feedback Control and Content in E-UTRA," R1-072077, 3GPP TSG-RAN WG1 Meeting #49, May 2007, XP-050105831.
Samsung, "Data and Control Channel Multiplexing in SC-FDMA for EUTRA Uplink," R1-051343, 3GPP TSG RAN WG1 #43, Nov. 2005, XP-002450962.
3rd Generation Partnership Project (3GPP), "Physical Layer Aspects for Evolved UTRA (Release 7)," 3GPP TR 25.814 v1.0.1, Dec. 2005, XP-002436402.
NTT DoCoMo Inc. et al., "Multiplexing Method of Shared Control Channel in Uplink Single-Carrier FDMA Radio Access," R1-051143, 3GPP TSG RAN WG1 #42bis, Oct. 2005, XP-002450609.
InterDigital Communications Corporation, "Uplink MIMO SC-FDMA Scheme for E-UTRA," R1-051368, 3GPP TSG RAN WG1 #43, Nov. 2005, XP-002439856.
3rd Generation Partnership Project (3GPP), "Technical Specification Group Radio Access Network; LTE Physical Layer—General Description (Release 8)," 3GPP TS 36.201, V0.3.1, R1-071252, Mar. 2007, XP-050105207.
Motorola, "Search Space Definition for L1/L2 Control Channels," R1-072691, 3GPP TSG RAN1 #49bis, Jun. 2007.
Mitsubishi Electric, "UE and CCE specific scrambling codes for low complexity blind detection of downlink control signaling," R1-072063, 3GPP TSG RAN WG1 #49 Meeting, May 2007.
United States Patent and Trademark Office U.S. Appl. No. 12/673,434, Final Office Action dated Oct. 5, 2012, 27 pages.
United States Patent and Trademark Office U.S. Appl. No. 12/532,944, Final Office Action dated Feb. 5, 2013, 16 pages.
3rd Generation Partnership Project, "Technical Specification Group Radio Access Network; Evolved Universal Terrestrial Radio Access (E-UTRA); Radio Resource Control (RRC); Protocol specification (Release 8)", 3GPP TS 36.331, V8.0.0, Dec. 2007.
3rd Generation Partnership Project, "Technical Specification Group Radio Access Network; Evolved Universal Terrestrial Radio Access (E-UTRA); Radio Resource Control (RRC); Protocol specification (Release 10)", 3GPP TS 36.331, V10.2.0, Jun. 2011.
United States Patent and Trademark Office U.S. Appl. No. 12/532,944, Office Action dated Sep. 3, 2013, 17 pages.

* cited by examiner

METHOD OF TRANSMITTING SOUNDING REFERENCE SIGNAL

CROSS-REFERENCE TO RELATED APPLICATIONS

This application is the National Stage filing under 35 U.S.C. 371 U.S. of international application PCT/KR2008/003436, filed on Jun. 18, 2008, which claims priority to U.S. provisional application No. 60/944,802, filed on Jun. 19, 2007 and claims the benefit of earlier filing date and right of priority to Korean patent application no. 10-2008-0057118, filed on Jun. 18, 2008, the contents of all of which are hereby incorporated by reference herein in their entirety.

TECHNICAL FIELD

The present invention relates to wireless communications, and more particularly, to a method of transmitting a sounding reference signal.

BACKGROUND ART

In next generation wireless communication systems, multimedia data can be transmitted with high quality at a high speed by using limited radio resources. To achieve this, a spectral efficiency has to be maximized since a radio channel has a limited bandwidth. In addition, inter-symbol interference and frequency selective fading, which occur during high-speed transmission, have to be overcome.

In order to improve performance of the wireless communication system, a closed-loop transmission scheme using a channel condition between a base station (BS) and a user equipment (UE) has been introduced. An adaptive modulation and coding (AMC) scheme is used to improve link performance. In the AMC scheme, the BS controls a modulation and coding scheme (MCS) by using feedback of channel condition information.

In general, the UE informs the BS of a downlink channel condition in a well-known format, e.g., a channel quality indicator (CQI). The BS can receive the downlink channel condition from all UEs and perform frequency selective scheduling. To perform the frequency selective scheduling in uplink, the BS has to know an uplink channel condition as well.

A reference signal is used to measure the channel condition. The reference signal is known to both the BS and the UE and is also referred to as a pilot. An uplink reference signal has two types of signals, i.e., a demodulation reference signal and a sounding reference signal (SRS). The demodulation reference signal is used in channel estimation for data demodulation. The SRS is used in user scheduling irrespective of data transmission.

In addition to the SRS, a variety of data or uplink control information is transmitted on the uplink control channel. Examples of the uplink control signal are an acknowledgment (ACK)/negative-acknowledgement (NACK) signal used to perform hybrid automatic repeat request (HARM), a channel quality indicator (CQI) indicating downlink channel quality, a precoding matrix index (PMI), a rank indicator (RI), etc.

Uplink transmission is performed by the UE. Thus, it is important for the UE to have a low peak-to-average power ratio (PAPR) in order to decrease battery consumption. For this, a modulation scheme having single carrier characteristics can be selected in uplink transmission. The SRS is not related to uplink data or uplink control information. Therefore, when the SRS is transmitted simultaneously with other uplink control channel or uplink data, it is difficult to preserve the single carrier characteristics.

Accordingly, there is a need to effectively operate signals so that collision does not occur between a sounding signal and data or between the sounding signal and a control signal in order to preserve single carrier characteristics.

DISCLOSURE OF INVENTION

Technical Problem

The present invention provides a method of transmitting a sounding reference signal used for effective operation of a radio resource.

Technical Solution

According to an aspect of the present invention, a method of transmitting a sounding reference signal (SRS) is provided. The method includes receiving SRS operation information including a sounding indicator, the sounding indicator indicating whether SRS transmission takes place at a subframe; generating the SRS according to the SRS operation information, and if the sounding indicator indicates occurrence of SRS transmission, transmitting the SRS at the subframe.

According to another aspect of the present invention, a method of operating an SRS is provided. The method includes transmitting, to a user equipment, SRS operation information including a sounding indicator and a simultaneous transmission indicator, the sounding indicator indicating whether SRS transmission takes place at a subframe, the simultaneous transmission indicator indicating whether a control signal and the SRS are simultaneously transmitted; and receiving the SRS or the control signal at the subframe.

Advantageous Effects

According to the present invention, multiplexing can be achieved without collision between data and a sounding reference signal by using a sounding indicator. In addition, multiplexing can be achieved without collision between a control signal and the sounding reference signal by using a simultaneous transmission indicator. Therefore, single carrier characteristics required in uplink transmission can be preserved.

MODE FOR THE INVENTION

In the following descriptions, a downlink represents a communication link from a base station (BS) to a user equipment (UE), and an uplink represents a communication link from the UE to the BS. In downlink, a transmitter may be a part of the BS, and a receiver may be a part of the UE. In uplink, the transmitter may be a part of the UE, and the receiver may be a part of the BS. The UE may be fixed or mobile, and may be referred to as another terminology, such as a mobile station (MS), a user terminal (UT), a subscriber station (SS), a wireless device, etc. The BS is generally a fixed station that communicates with the UE and may be referred to as another terminology, such as a node-B, a base transceiver system (BTS), an access point, etc. There are one or more cells within the coverage of the BS.

Figure 1:
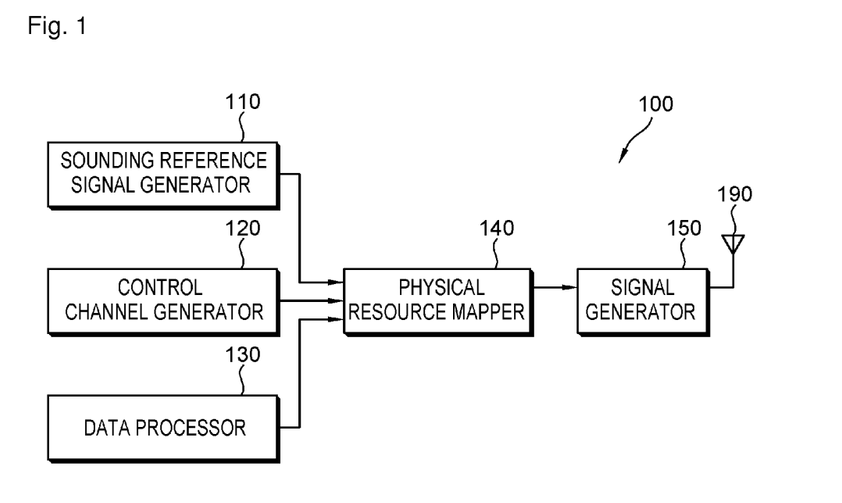
FIG. 1 is a block diagram of a transmitter according to an embodiment of the present invention.

FIG. 1 is a block diagram of a transmitter according to an embodiment of the present invention.

Referring to FIG. 1, a transmitter 100 includes a sounding reference signal generator 110, a control channel generator 120, a data processor 130, a physical resource mapper 140, and a signal generator 150.

The sounding reference signal generator 110 generates a sounding reference signal. A reference signal has two types of signals, i.e., a demodulation reference signal and the sounding reference signal. The demodulation reference signal is used in channel estimation for data demodulation. The sounding reference signal is used in uplink scheduling. A reference signal sequence used by the demodulation reference signal may be the same as that used by the sounding reference signal.

The control channel generator 120 generates a physical uplink control channel (PUCCH) for carrying uplink control information.

The data processor 130 processes user data and thus generates complex-valued symbols. The physical resource mapper 140 maps the sounding reference signal, the control channel, and/or the complex-valued symbols for the user data onto physical resources. The physical resources may be resource elements or subcarriers.

The signal generator 150 generates time-domain signals to be transmitted through a transmit antenna 190. The signal generator 150 may generate the time-domain signals by using a single carrier-frequency division multiple access (SC-FDMA) scheme. The time-domain signal output from the signal generator 150 is referred to as an SC-FDMA symbol or an orthogonal frequency division multiple access (OFDMA) symbol.

It will be assumed hereinafter that the signal generator 150 uses the SC-FDMA scheme. However, this is for exemplary purposes only, and thus the present invention may also apply to other multiple-access schemes. For example, the present invention may apply to various multiple-access schemes such as OFDMA, code division multiple access (CDMA), time division multiple access (TDMA), and frequency division multiple access (FDMA).

Figure 2:
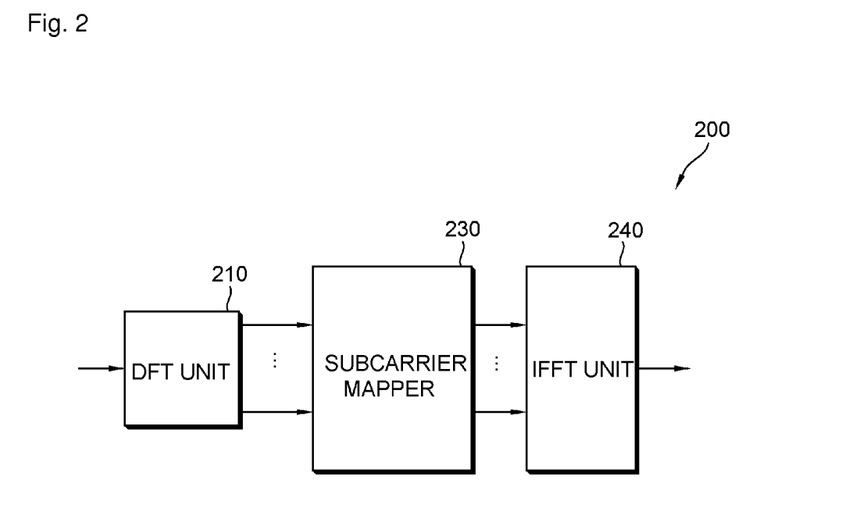
FIG. 2 is a block diagram of a signal generator according to an SC-FDMA scheme.

FIG. 2 is a block diagram of a signal generator according to an SC-FDMA scheme.

Referring to FIG. 2, a signal generator 200 includes a discrete Fourier transform (DFT) unit 220 that performs DFT, a subcarrier mapper 230, and an inverse fast Fourier transform (IFFT) unit 240 that performs IFFT. The DFT unit 220 performs DFT on input data and thus outputs frequency-domain symbols. The subcarrier mapper 230 maps the frequency-domain symbols onto respective subcarriers. The IFFT unit 230 performs IFFT on input symbols and thus outputs time-domain signals.

Figure 3:
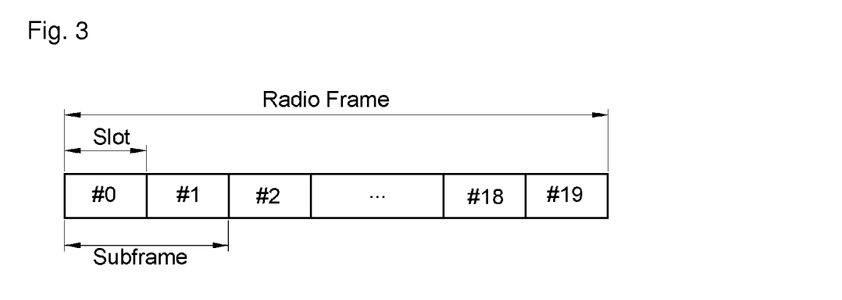
FIG. 3 shows a structure of a radio frame.

FIG. 3 shows a structure of a radio frame.

Referring to FIG. 3, the radio frame includes 10 subframes. One subframe includes two slots. A time for transmitting one subframe is defined as a transmission time interval (TTI). For example, one subframe may have a length of 1 ms, and one slot may have a length of 0.5 ms. One slot includes a plurality of SC-FDMA symbols in a time domain and a plurality of resource blocks in a frequency domain.

The radio frame of FIG. 3 is shown for exemplary purposes only. Thus, the number of subframes included in the radio frame or the number of slots included in the subframe or the number of SC-FDMA symbols included in the slot may change variously.

Figure 4:
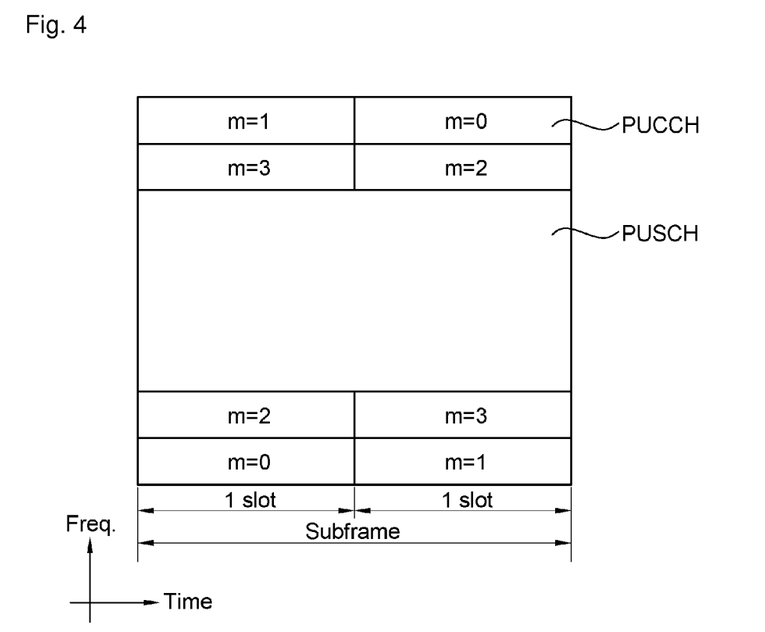
FIG. 4 shows a structure of an uplink subframe.

FIG. 4 shows a structure of an uplink subframe.

Referring to FIG. 4, the uplink subframe is divided into two regions. One region is assigned to a physical uplink control channel (PUCCH), which is used for carrying uplink control information. The other region is assigned to a physical uplink shared channel (PUSCH), which is used for carrying user data. A middle portion of frequency domain in the subframe is assigned to the PUSCH. Both edges of the data region are assigned to the PUCCH. One UE does not simultaneously transmit the PUCCH and the PUSCH.

Example of the uplink control information transmitted on the PUCCH are an acknowledgment (ACK)/negative-acknowledgement (NACK) signal used to perform hybrid automatic repeat request (HARM), a channel quality indicator (CQI) indicating a downlink channel condition, a scheduling request signal used to request uplink radio resource allocation, etc.

The PUCCH for one UE uses one resource block which occupies a different frequency band in each of two slots in the subframe. The two slots use different resource blocks (or subcarriers) in the subframe. This is said that the two resource blocks assigned to the PUCCH are frequency-hopped in a slot boundary. It is assumed herein that the PUCCH is assigned to the subframe for 4 UEs respectively in association with a PUCCH (m=0), a PUCCH (m=1), a PUCCH (m=2), and a PUCCH (m=3).

The PUCCH can support multiple formats. That is, according to a modulation scheme, the number of bits for the uplink control information can be different. For example, when binary phase shift keying (BPSK) is used, 1-bit uplink control information can be transmitted on the PUCCH, and when Quadrature phase shift keying (QPSK) is used, 2-bit uplink control information can be transmitted on the PUCCH.

Figure 5:
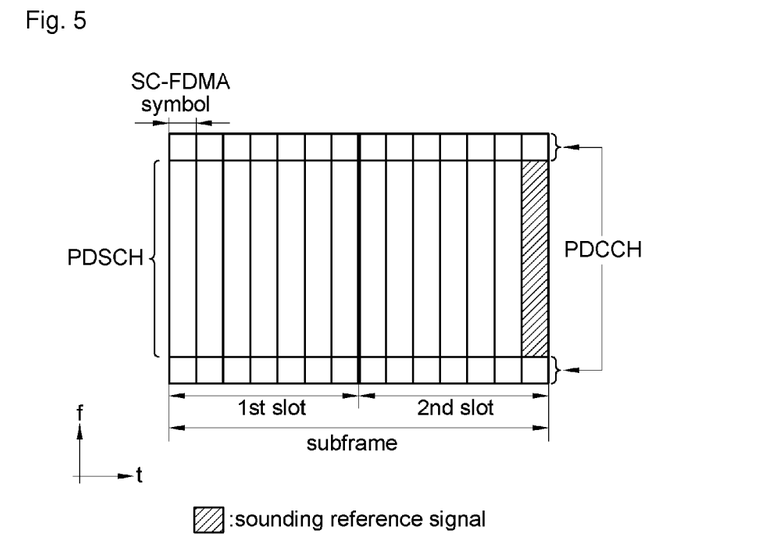
FIG. 5 shows a structure of an uplink radio frame for transmitting a sounding reference signal (SRS) according to an embodiment of the present invention.

FIG. 5 shows a structure of an uplink radio frame for transmitting a sounding reference signal (SRS) according to an embodiment of the present invention.

Referring to FIG. 5, the uplink subframe includes 2 slots on a time axis. Each slot includes 7 SC-FDMA symbols. The uplink subframe includes a PUCCH and a PUSCH on a frequency axis. The PUCCH is punctured in an SC-FDMA symbol duration in which the SRS is transmitted. In this case, a UE transmits data by using 13 SC-FDMA symbols, and transmits the SRS by performing a precoding process (e.g., rate matching) on the remaining one SC-FDMA symbol.

It will be referred hereinafter that the SC-FDMA symbol in which the SRS is transmitted is referred to as a sounding symbol. Although a 14th SC-FDMA symbol is determined as the sounding symbol in FIG. 5, this is for exemplary purposes only. Thus, the position and the number of the sounding symbols may vary. The SRS is not transmitted on the PUCCH but is transmitted on the PUSCH. The SRS may be transmitted through all or some parts of the PUSCH.

The position of the sounding symbol may be information well-known by a predetermined protocol between a UE and a BS or may be information reported by the BS to the UE when necessary.

One SC-FDMA symbol corresponds to a plurality of subcarriers. Thus, each UE can transmit the SRS by using different subcarriers. This is called frequency division multiplexing. For example, a first UE may transmit an SRS by using a subcarrier with an odd index, and a second UE may transmit an SRS by using a subcarrier with an even index. Further, each UE may transmit an SRS by using different orthogonal codes. This is called code division multiplexing. Furthermore, even if the sounding symbol is predetermined, each UE may transmit an SRS in a different subframe. This is called time division multiplexing. For effective operation of the SRS, the BS may negotiate in advance with the UE about an operation and transmission of the SRS on the basis of several parameters. The parameters are referred to as SRS operation information. The SRS operation information may be included in uplink scheduling information when transmitted. Table 1 below shows an example of the SRS operation information.

TABLE 1

| Parameter | Physical Channel | Rate of Change | Contents |
|---|---|---|---|
| Full SRS Bandwidth | Broadcast | Low | indicates the maximum SRS bandwidth that UE covers for sending SRS in the cell |
| SRS Bandwidth | Dedicated | | indicates a bandwidth on which UE transmits SRS at every SRS transmission period. |
| Frequency-Domain position | Dedicated | | indicates RB offset position for hopping in transmitting SRS |
| Frequency Hopping Information | Dedicated | | indicates pattern of hopping |
| Duration | Dedicated | | indicates time during which SRS transmission continues |
| Period | Dedicated | | indicates time period at which SRS transmission takes place |
| Subframe Offset | Dedicated | | indicates a position of a subframe in which UE transmits SRS |
| Transmission Comb | Dedicated | | indicates which set of subcarrier is used for SRS transmission |
| Cyclic Shift | Dedicated | | indicates cyclic shift to be used for SRS transmission |
| SRS indicator | Broadcast or Dedicated | Low | indicates which subframe is used for SRS transmission and which subframe is not |
| Simultaneous Trasmission Indicator | Broadcast orDedicated | Low | indicates whether simultaneous transmission of ACK/NACK signal and SRS takes place. In case of non-simultaneous transmission, ACK/NACK signal is prior to SRS |

Referring to Table 1, a full SRS bandwidth indicates a whole frequency bandwidth on which an SRS is transmitted. An SRS bandwidth indicates a frequency bandwidth on which an SRS is transmitted at every transmission period of the SRS. The SRS bandwidth may be 2-bit information. The SRS bandwidth is less than or equal to the full SRS bandwidth. Therefore, in order to cover the full SRS bandwidth, the UE transmits an SRS with the SRS bandwidth at least one or more times.

The SRS can be classified into a narrowband SRS and a wideband SRS according to a size of a resource block. For transmission of the narrow SRS, resource blocks having a size of 2, 4, and 6 may be used except for frequency bands used for an uplink control channel. For transmission of the wideband SRS, a size of a resource block in use may correspond to the full SRS bandwidth.

A duration indicates a time (or a subframe length) during which SRS transmission continues. The duration of the SRS can be determined in various ways. For example, the duration may be determined so that an SRS can be sent in each transmission only in a predetermined number of subframes. This is a sort of 'oneshot' transmission concept. For another example, a start time (or a start subframe) at which SRS transmission takes place is informed, and thereafter transmission is continued with a specific period.

A period denotes a time period at which SRS transmission takes place. In order to reduce an overhead generated when the period is transmitted, a predetermined number of period sets may be considered as the period. For example, when one value is selected as the period from a set {2, 5, 10, 20, 40, 80, 160, . . . }, signaling is possible with 3-bit information. Of course, the size and values of the period set can vary according to a possible number of bits with which signaling can be achieved without generating the overhead.

According to a system condition, there may be a case where the UE cannot transmit an SRS at a predetermined period. This problem can be solved by dynamically changing the period. For example, the period may change from 10 ms to 20 ms. The period may be changed by either the UE or the BS.

A transmission comb indicates an index type of a subcarrier to be used for SRS transmission among a plurality of subcarriers. The transmission comb may be 1-bit information. The 1-bit information can indicate an odd-indexed subcarrier or an even-indexed subcarrier.

A cyclic shift indicates a cyclic shift to be used for SRS transmission. A plurality of UEs may be multiplexed in a code division manner in the same-sized SRS bandwidth to transmit an SRS. A base sequence used in SRS transmission may be shifted by a predetermined cyclic shift, so that orthogonality can be guaranteed between SRSs. The number of shifted codes may vary according to a channel condition. In general, the number of shifted codes is 6, and in this case, 3 bits are required to specify a certain cyclic shift.

A sounding indicator is control information indicating whether SRS transmission takes place or not in a specific subframe. For example, it is assumed that a first UE is scheduled to transmit an SRS at a first subframe, and a second UE does not have to transmit an SRS at the first subframe. In this case, if the second UE transmits data by using an SC-FDMA symbol, not knowing that the first UE transmits the SRS using the SC-FDMA symbol, then the SRS of the first UE collides with the data of the second UE, which may adversely affect multiplexing.

To solve this problem, the BS may inform all UEs of the fact that SRS transmission takes place at the specific subframe by using the sounding indicator. To prevent collision, instead of transmitting data on the SC-FDMA symbol on which the SRS is transmitted, each UE may transmit data by using remaining SC-FDMAs other than the SC-FDMA symbol on which the SRS is transmitted.

A simultaneous transmission indicator indicates whether transmission of an ACK/NACK signal and an SRS takes place simultaneously. A subframe that supports simultaneous transmission of the ACK/NACK signal and the SRS may have a different structure from a subframe that does not support the simultaneous transmission thereof. The subframe structure will be described below.

Figure 6:
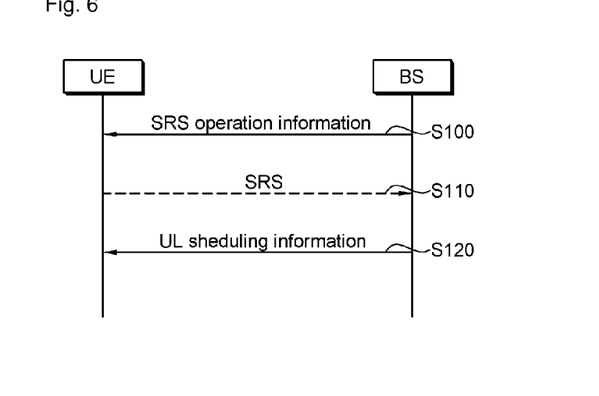
FIG. 6 is a flow diagram showing a method of transmitting a sounding reference signal (SRS) according to an embodiment of the present invention.

FIG. 6 is a flow diagram showing a method of transmitting a sounding reference signal (SRS) according to an embodiment of the present invention.

Referring to FIG. 6, a UE receives SRS operation information from a BS (step S100). The SRS operation information includes a sounding indicator. The sounding indicator may be 1-bit information indicating whether SRS transmission takes place in a specific frame. For example, when the sounding indicator indicates 'ON', it indicates that at least one UE transmits an SRS in the specific subframe. On the contrary, when the sounding indicator indicates 'OFF', it indicates no UE transmits the SRS in the specific subframe. The sounding indicator is provided for exemplary purposes only. Thus, the sounding indicator may include all information for solving multiplexing problems. The multiplexing problems occur since a position on a time/frequency domain, a transmission period, and the like are different from one UE to another when the SRS is transmitted.

As such, when the SRS is transmitted on a specific SC-FDMA symbol, the BS can report this to the UE by using the sounding indicator, so that no UE transmits data on the specific SC-FDMA symbol.

For a special case where an SRS is not transmitted, a SC-FDMA symbol which is originally reserved or assigned for transmission of the SRS may be used for transmission of uplink data. In this case, the SC-FDMA symbol reserved for transmission of the SRS needs to be assigned for data transmission by the BS.

From an aspect of SRS transmission, the sounding indicator may be transmitted on the PDCCH as a signal of a physical layer or may be transmitted on a broadcasting channel (i.e., broadcast channel (BCH) or on a downlink-shared channel (DL-SCH)) as a message of an upper layer so that all UEs can receive the message. The upper layer may be a medium access control (MAC) layer or a radio resource control (RRC) layer. The BCH may be a primary BCH (P-BCH) or a dynamic BCH (D-BCH). The D-BCH is used to map system information block (SIB) on a physical downlink shared channel (PD-SCH). The sounding indicator may be independently transmitted to each UE by using a dedicated channel.

To perform the same function as the sounding indicator, the message of the upper layer includes all data types or control signal formats that can be configured in the upper layer.

If the sounding indicator indicates 'ON', the UE transmits an SRS by using a sounding symbol determined when the SRS is transmitted at a subframe. If the sounding indicator indicates 'OFF', the UE does not transmit the SRS on the sounding symbol (step S110).

When the BS receives the SRS from the UE, the BS estimates an uplink channel from the SRS, and performs uplink scheduling for uplink transmission on the basis of the estimated uplink channel. The BS transmits new uplink scheduling information based on the SRS to the UE (step S120). The uplink scheduling information is also referred to as an uplink grant and is transmitted through the PDCCH. The uplink scheduling information includes resource assignment (i.e., information on resources assigned to the UE), a modulation and coding scheme (MCS), a transmit power control (TPC), the SRS operation information, etc.

The sounding indicator has been described above. Now, the simultaneous transmission indicator (STI) will be described. As described above, the STI is control information indicating whether simultaneous transmission of an ACK/NACK signal and an SRS is possible at a specific subframe.

It is difficult to simultaneously transmit a control signal and an SRS on an uplink channel in order to preserve single carrier characteristics in SC-FDMA. Various methods can be used to preserve the single carrier characteristics. For example, an SRS and a control signal can be multiplexed in such as manner that the SRS is transmitted on a specific SC-FDMA symbol within a subframe designated for SRS transmission, and the control signal is transmitted on the remaining symbols other than the specific SC-FDMA symbol. In this case, the number of SC-FDMA symbols used for control signal transmission is reduced. A control channel format in which the number of SC-FDMA symbols is reduced in a PUCCH is referred to as a shortened PUCCH format.

For another example, the single carrier characteristics can be preserved in such as manner that one of the control signal and the SRS is transmitted and transmission of the remaining one is suspended. Whether to transmit the control signal or the SRS can be determined by considering an influence on a system. In a case where only the control signal is transmitted while suspending SRS transmission, a control channel format is referred to as a normal PUCCH format.

The STI may be information indicating which format is used between the shortened PUCCH format and the normal PUCCH format. The STI may be transmitted to all UEs through the broadcasting channel or may be transmitted to each UE through an individual dedicated channel. The STI may be 1-bit information. That is, by using 1-bit information, it can be indicated which format is used between the shortened PUCCH format and the normal PUCCH format. If the STI indicates the shortened PUCCH format, the UE can simultaneously transmit the SRS and the ACK/NACK signal by using the shortened PUCCH format. Otherwise, if the STI indicates the normal PUCCH format, the UE can transmit either the SRS or the ACK/NACK signal by using the normal PUCCH format.

Figure 7:
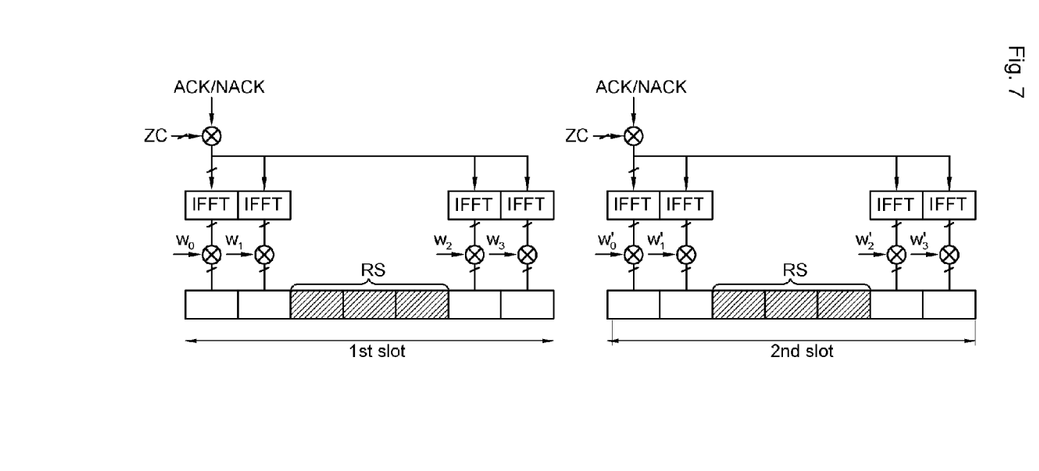
FIG. 7 shows a structure of an ACK/NACK channel in an uplink subframe.

FIG. 7 shows a structure of an ACK/NACK channel in an uplink subframe. The ACK/NACK channel is a control channel used when a simultaneous transmission indicator (STI) indicates a normal PUCCH format. It is assumed herein that an ACK/NACK signal is transmitted while transmission of a sounding reference signal (SRS) is suspended. The ACK/NACK channel is a control channel for transmitting the ACK/NACK signal on a PUCCH. For clear explanation, it will be assumed that one slot includes 7 SC-FDMA symbols and one subframe includes two slots. When a control signal is transmitted in a pre-allocated band, frequency-domain spreading and time-domain spreading are simultaneously used to increase the number of multiplexible UEs or the number of control channels.

Referring to FIG. 7, among the 7 SC-FDMA symbols included in one slot, a demodulation reference signal (indicated by RS in the figure) is carried on 3 SC-FDMA symbols and the ACK/NACK signal is carried on the remaining 4 SC-FDMA symbols. The demodulation reference signal is carried on 3 contiguous SC-FDMA symbols. The position and the number of symbols used in the demodulation reference signal may vary. Accordingly, the position and the number of symbols used in the ACK/NACK signal may also vary. The ACK/NACK signal is a transmission and/or reception confirm signal for downlink data.

A frequency-domain spreading code is used to spread the ACK/NACK signal in the frequency domain. A first orthogonal code is used as the frequency-domain spreading code. A Zadoff-Chu (ZC) sequence is one of constant amplitude zero auto-correlation (CAZAC) sequences and is used as the first orthogonal code. However, this is for exemplary purposes only, and thus other sequences having excellent correlation characteristics can also be used. In particular, each control channel can be identified by using a ZC sequence having a different cyclic shift value.

Figure 8:
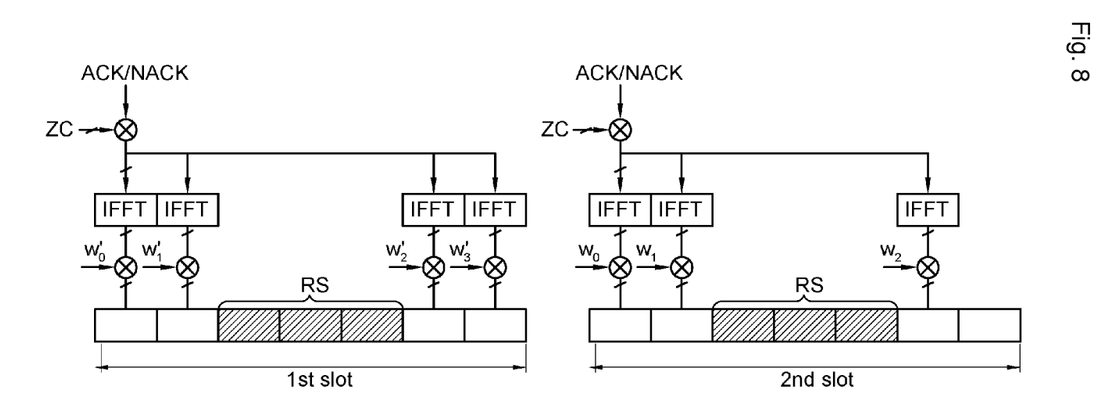
FIG. 8 shows an example of simultaneous transmission of an SRS and ACK/NACK signal on an uplink subframe.

FIG. 8 shows an example of simultaneous transmission of an SRS and ACK/NACK signal on an uplink subframe. This is a case where an STI indicates a shortened PUCCH format.

Referring to FIG. 8, among 7 SC-FDMA symbols of a 1st slot, a demodulation reference signal (indicated by RS in the figure) is carried on 3 SC-FDMA symbols and an ACK/NACK signal is carried on the remaining 4 SC-FDMA symbols. Meanwhile, among 7 SC-FDMA symbols of a 2nd slot, a demodulation reference signal is carried on three SC-FDMA symbols, an ACK/NACK signal is carried on 3 SC-FDMA symbols, and remaining one SC-FDMA symbol is punctured.

Figure 9:
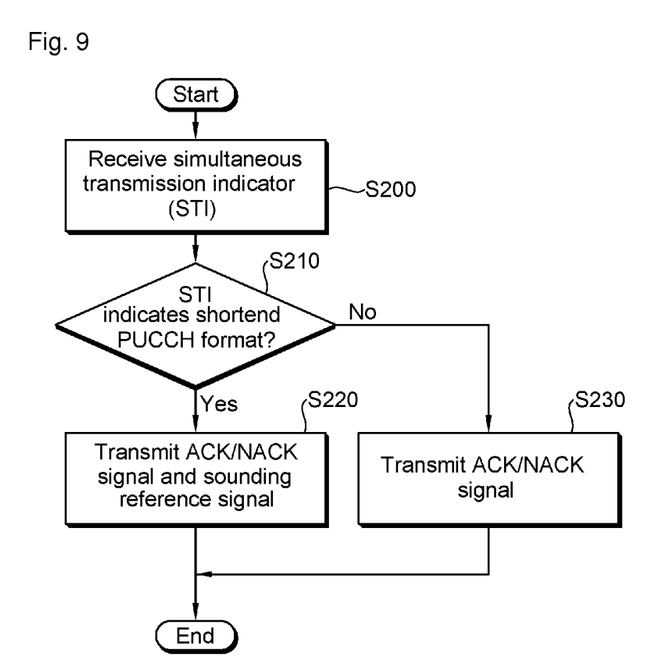
FIG. 9 is a flow chart showing a method of transmitting an SRS according to an embodiment of the present invention.

FIG. 9 is a flow chart showing a method of transmitting an SRS according to an embodiment of the present invention.

Referring to FIG. 9, a UE receives a simultaneous transmission indicator (STI) from a BS (step S200). The STI may be included in uplink scheduling information when transmitted. Further, the STI may be transmitted through a physical channel (i.e., a P-BCH or a D-BCH) or may be transmitted by signaling of an upper layer (i.e., a MAC layer or an RRC layer).

The UE determines whether the STI indicates a shortened PUCCH format (step S210). If the STI indicates the shortened PUCCH format, the UE transmits an SRS on a sounding symbol, and transmits an ACK/NACK signal on the remaining symbols other than the sounding symbol (step S220). Otherwise, if the STI indicates a normal PUCCH format, the UE suspends transmission of the sounding symbol and transmits only the ACK/NACK signal (step S230).

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a sounding reference signal in a wireless communication system, the method comprising:
　receiving, by a user equipment (UE) from a base station (BS), a simultaneous transmission indicator that indicates whether a sounding reference signal (SRS) and a hybrid automatic retransmission request (HARQ) acknowledgement/non-acknowledgement (ACK/NACK) are transmitted in a same subframe;
　receiving, by the UE from the BS, SRS operation information that indicates a periodicity of transmission of the SRS and a subframe offset used for the transmission of the SRS;
　transmitting, by the UE to the BS, the SRS, the HARQ ACK/NACK and a demodulation reference signal (DM-RS) used by the BS to demodulate the HARQ ACK/NACK in an SRS subframe when the simultaneous transmission indicator indicates that the SRS and the HARQ ACK/NACK are transmitted in the same subframe; and
　transmitting, by the UE to the BS, the HARQ ACK/NACK and the DM-RS in the SRS subframe without the SRS when the simultaneous transmission indicator indicates that the SRS and the HARQ ACK/NACK are not transmitted in the same subframe,
　wherein the SRS subframe is determined from among a plurality of subframes according to the SRS operation information,
　wherein the SRS is transmitted in a last single carrier-frequency division multiple access (SC-FDMA) symbol of the SRS subframe, and
　wherein the HARQ ACK/NACK and the DM-RS are transmitted in remaining SC-FDMA symbols of the SRS subframe.

2. A user equipment (UE) configured to transmit a sounding reference signal in a wireless communication system, the UE comprising;
　a memory configured to store information; and
　a processor coupled with the memory and configured to:
　receive, by the UE from a base station (BS), a simultaneous transmission indicator that indicates whether a sounding reference signal (SRS) and a hybrid automatic retransmission request (HARQ) acknowledgement/non-acknowledgement (ACK/NACK) are transmitted in a same subframe;
　receive, by the UE from the BS, SRS operation information that indicates a periodicity of transmission of the SRS and a subframe offset used for the transmission of the SRS;
　transmit, by the UE to the BS, the SRS, the HARQ ACK/NACK and a demodulation reference signal(DM-RS) used by the base station to demodulate the HARQ ACK/NACK in an SRS subframe when the simultaneous transmission indicator indicates that the SRS and the HARQ ACK/NACK are transmitted in the same subframe, and
　transmit, by the UE to the BS, the HARQ ACK/NACK and the DM-RS in the SRS subframe without the SRS when the simultaneous transmission indicator indicates that the SRS and the HARQ ACK/NACK are not transmitted in the same subframe,
　wherein the SRS subframe is determined from among a plurality of subframes according to the SRS operation information,
　wherein the SRS is transmitted in a last single carrier-frequency division multiple access (SC-FDMA) symbol of the SRS subframe, and
　wherein the HARQ ACK/NACK and the DM-RS are transmitted in remaining SC-FDMA symbols of the SRS subframe.

\* \* \* \* \*